Sept. 14, 1954 K. E. PALM 2,688,897
TESTING MOTION-PICTURE CAMERAS
Filed Dec. 30, 1949
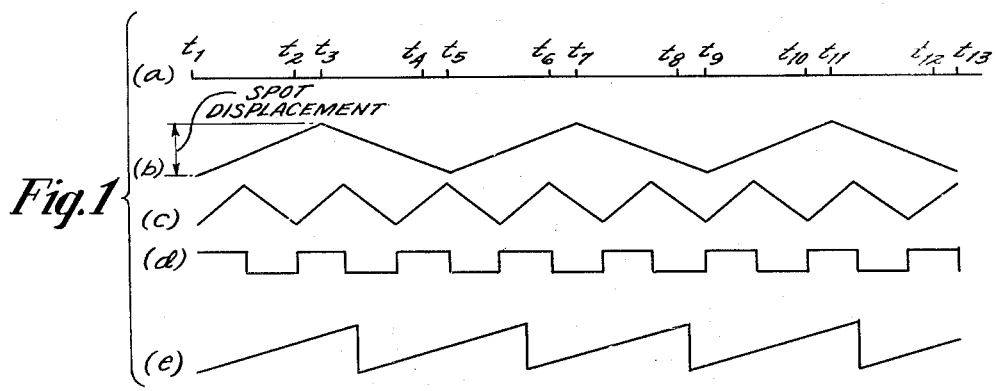
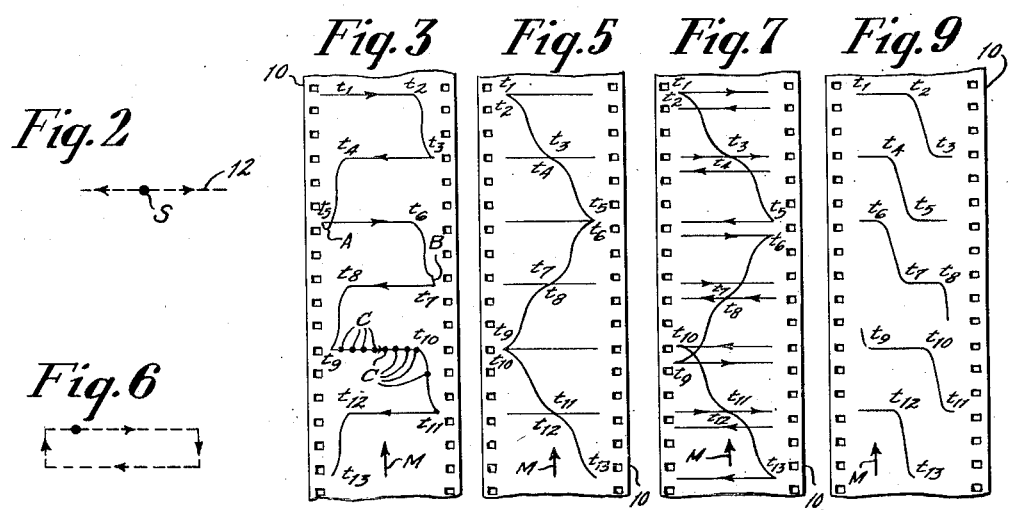
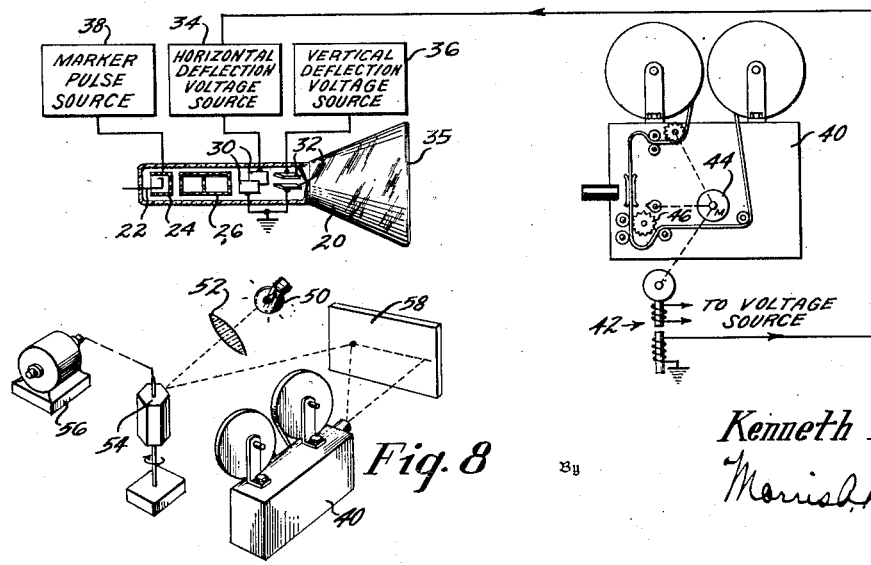
Inventor
Kenneth E. Palm
Attorney

UNITED STATES PATENT OFFICE 2,688,897

TESTING MOTION-PICTURE CAMERAS

Kenneth E. Palm, Philadelphia, Pa., assignor to Radio Corporation of America, a corporation of Delaware Application December 30, 1949, Serial No. 136,115

The terminal 15 years of the term of the patent to be granted has been disclaimed 9 Claims. (Cl. 88—14)

This invention relates to improvements in the art of testing motion picture cameras, and particularly to an improved method of and apparatus for obtaining a record of film movement in a motion picture camera of the so-called intermittent motion type.

In the intermittent motion movie camera, the film does not move steadily through the film gate of the camera, but is stopped temporarily while the camera shutter opens for exposure of each frame, and then is moved a predetermined distance while the shutter is closed.

When a motion picture camera of the foregoing intermittent motion type is being tested, it is desirable to have some measure of the exact movement of the film through the camera in order to check the adjustment of the film driving mechanism. That is, the "dwell time" (i. e. the time that the film is motionless in the film gate) and the "pull-down time" (i. e. the time that the film is in motion between dwell times) must be properly correlated if the camera is to function properly. Also, the film should not "overshoot" or "undershoot," but should move exactly the predetermined distance between frames, especially when the camera is used in kinescope photography or the like. Such systems as have been proposed for checking film movement have not proved to be satisfactory in all respects.

It is, accordingly, a general object of the present invention to provide an improved method of and apparatus for checking film movement in a motion picture camera.

Another object of the invention is to provide a method of and apparatus for obtaining a record of motion picture camera film movement.

In accordance with the invention, the foregoing and other related objects and advantages are attained by exposing the film in a camera being tested to a spot of light which is moving repeatedly through a predetermined pattern while the film is moving in the usual intermittent fashion. When the exposed film is developed to bring out the image of the light spot on the film, the resultant trace or pattern on the film provides a convenient record of the film motion and can be referred to in making any necessary adjustments of the camera film drive mechanism.

A more complete understanding of the invention can be had by reference to the following description of illustrative embodiments thereof, when considered in connection with the accompanying drawing wherein:

Fig. 1 is a chart illustrating certain of the principles of the invention,

Figs. 2 and 6 illustrate the motion of a spot of light such as may be used in practicing the method of the present invention, Figs. 3, 5, 7, and 9 illustrate typical records of film movement made in accordance with the invention, Fig. 4 is a schematic diagram of apparatus for recording film movement in accordance with the invention, and Fig. 8 is an alternative form of apparatus for practicing the method of the present invention.

In the following description, numerical values have been assigned to the various characteristics of film movement for the sake of concreteness, although it will be appreciated that the assumed values are purely illustrative. It will be assumed that it is desired to check the film movement in a camera of the type in which the film is exposed at the rate of 24 sections or frames per second. Also, it will be assumed that the dwell time per frame nominally is $\frac{1}{30}$ sec., and that the pull down time nominally is $\frac{1}{120}$ sec. Referring to Fig. 1 of the drawing, line $a$ is subdivided into time intervals $t_1-t_2$, $t_3-t_4$, $t_5-t_6$, $t_7-t_8$, $t_9-t_{10}$, and $t_{11}-t_{12}$ to represent the dwell time for six consecutive film frames, during which time the film should be at rest in the film gate. The intervening intervals $t_2-t_3$, $t_4-t_5$, $t_6-t_7$, $t_8-t_9$, $t_{10}-t_{11}$ represent pull-down periods, during which the film should be moving through the film gate.

In accordance with the invention, a record of the movement of the film through the camera gate is obtained by disabling or removing the camera shutter mechanism so that the undeveloped film in the camera will be continuously exposed to a spot of light moving repeatedly through the same predetermined path. For example, the film may be exposed to a spot of light S which is caused to move repeatedly back and forth along a path designated by the dotted line 12 in Fig. 2. The time rate of displacement of the spot in comparison with the film movement may be of the order of 12 cycles per second, as shown in Fig. 1(b). If the undeveloped film is exposed to this moving light spot as the film undergoes several cycles of intermittent motion, when the film is developed it will contain a record of the film motion in the form of a line or trace which is the image of the light spot on the developed film. For example, in Fig. 3 there is shown a section of developed film 10 containing a record such as may be obtained with the film motion and light spot displacement related as in Fig. 1(a) and (b). In the example shown in Fig. 3, it can be seen that the motion of the spot was from left to right across the film during the time interval $t_1$—$t_3$. During the time $t_1$—$t_2$, the film was at rest in the film gate. During the interval $t_2$—$t_3$, the film was moving through the film gate. During the subsequent intervals from time $t_3$ to time $t_{13}$, the light spot continued to move in the direction shown by the arrowheads, while the film either was at rest, as shown by the horizontal lines on the developed film, or in motion, as shown by the vertical curved lines on the film. The direction in which the film was moved through the camera is shown by the arrow M in Fig. 3 (as well as in Figs. 5, 7, and 9). The curvatures of the vertical traces on the developed film are, of course, due to the acceleration and deceleration of the film as it is started and stopped. This is of interest in measuring these important characteristics of film motion.

As an example of the manner in which "overshooting" of the film would be depicted on the developed film, consider the trace in Fig. 3 between the time intervals $t_4$ and $t_5$. At point A in Fig. 3, the trace has a loop A extending below the horizontal line from $t_5$ to $t_6$, showing that the film went slightly beyond the correct position in the film gate, and then was moved backward when the registration pins engaged the film just before the beginning of the dwell period. Similarly, "undershooting" in the film motion is depicted in Fig. 3 by the short vertical section B of the trace just before the horizontal line from $t_7$ to $t_8$. This shows that the film came to rest before being properly positioned in the film gate, and then was moved forward by the registration pins.

In order to measure the dwell time and the pull down time accurately, as well as to positively identify any given point on the film trace, a further expedient is helpful in practicing the method of the present invention. If the intensity of the light spot is modulated at a uniform rate, either by blacking out or by intensifying the spot, the film trace will contain "markers" which can be used for time interval measurements or for precise point identification. This is illustrated by the spots C on the trace in Fig. 3 between the times $t_9$ and $t_{11}$. These spots C are of the type which would result from periodically intensifying the light spot S in Fig. 2.

Turning now to a consideration of specific apparatus for practicing the foregoing method of film motion investigation, and referring to Fig. 4 of the drawing, a preferable form of light spot generator comprises a cathode ray tube 20 having the usual cathode 22, beam intensity control electrode 24, anode 26, and orthogonally related pairs of deflection plates 30, 32. For simplicity, the energizing voltages for the electron "gun" (i. e. electrodes 22, 24, 26) have been omitted from the drawing.

The deflection electrodes, 30, 32, each are connected to a deflection voltage source, 34, 36, respectively, and the output voltages of these sources 34, 36 may have any one of several different waveshapes, as will be explained. A source of marker pulses 38 preferably is connected to the intensity control electrode 24 of the cathode ray tube to provide intensity modulation of the cathode ray beam for facilitating time interval measurement, as previously explained. For example, the pulse source 38 may be of the type shown at page 40 in the publication "Handbook of Industrial Electronic Circuits," Markus and Zeluff, 1948.

The motion picture camera 40 to be tested is set up facing the fluorescent screen 35 of the cathode ray tube, as shown in Fig. 4.

If it is desired to have a record in which a symmetrical pattern is traced on the film by the light spot, the motion of the light spot should be synchronized with that of the film, although as will be shown, such synchronization is not essential to a successful practice of the invention. In the apparatus illustrated in Fig. 4, synchronization is provided by mechanically coupling an induction pulse generator 42 (similar to a conventional alternating current generator) to the drive motor 44 which actuates the intermittent film drive sprocket 46 in the camera. It will be understood that the drive sprocket 46 is rotated intermittently in response to continuous rotation of the motor 44 by any one of several well known mechanical linkages, such as a "Geneva movement" or the like.

As one example of the use of the apparatus shown in Fig. 4, it will be assumed that the output voltage of the horizontal deflection voltage source 34 has a triangular waveshape of the form shown in Fig. 1(b). In this case, the source 34 may comprise a square wave generator, operating at a frequency of 12 cycles per second, and having an integration circuit connected in the output section thereof to convert the square wave into a triangular wave. A typical circuit of this type is shown at page 172 of the above mentioned publication. Also, for the present example, it will be assumed that the vertical deflection voltage from the source 36 comprises an adjustable but unvarying unidirectional voltage for "centering" the cathode ray beam vertically on the screen 35 of the cathode ray tube. Accordingly, the light spot produced by the cathode ray beam on the fluorescent tube screen 35 will move back and forth horizontally across the screen 35 in the manner illustrated in Fig. 2. The camera 40 is set up facing the screen 35, as shown in Fig. 4, and the camera shutter mechanism is disabled or removed so that the film is continuously exposed as it moves through the camera. The unexposed film is moved through the camera by the motor 44 and associated film drive mechanism, and the film thereafter developed to bring out the image of the moving light spot to produce a record of the general form shown in Fig. 3. If the marker pulse generator 38 is operated, say at a frequency of 240 cycles per second, the record will contain time markers (as shown between the times $t_9$ and $t_{11}$ in Fig. 3). It is to be noted that it is unnecessary to synchronize the marker pulse generator 38 if it is desired to measure only time intervals. If particular points on the record are to be identified by reference to the marker spots, the generator 38 can be synchronized by suitable coupling to the generator 42.

An example of the results attainable without direct synchronization between film motion and light spot motion can best be explained by reference to Fig. 1(c). The pattern of horizontal spot displacement shown in Fig. 1(c) is a 30 cycle per second triangular wave, and it is assumed that the waveform represents the output voltage of the horizontal deflection voltage source 34, with the vertical deflection source 36 still supplying an unvarying "centering" voltage to the vertical deflection electrodes 32. An occasion for using this type of light spot motion arises where the intermittent film motion mechanism is driven by a synchronous motor energized from the usual 60 cycle power lines. In this case, the horizontal deflection voltage generator 34 can be synchronized by the voltage from the 60 cycle supply lines so that a relatively constant relation will be maintained between film motion and spot motion but without direct synchronization therebetween.

In Fig. 5, there is shown a record of film motion obtained by utilizing the light spot motion resulting from the deflection voltage shown in Fig. 1(c). It can be seen that this record is quite satisfactory except that some overlap occurs in the recorded trace, as, for example, between the times $t_1-t_2$. That is, the light spot moves from left to right and from right to left while the film is at rest during the time $t_1-t_2$. This overlap might be objectionable where the light spot is intensity modulated to provide time markers, since it would be difficult to determine the order in which the time markers occur. On the other hand, the horizontal expansion of the record resulting from the higher rate of spot deflection is very desirable because of the increased ease of interpreting the record. To retain this beneficial expansion of the record while avoiding overlap, a 30 cycle square wave, of the shape shown in Fig. 1(d), can be applied to the vertical deflection electrodes 32 in the cathode ray tube, in order to separate the "left-to-right" and "right-to-left" excursions of the light spot. The resultant motion of the light spot will be in a rectangular pattern as shown in Fig. 6, it being understood that the spot will move so rapidly through the vertical portions of the pattern in Fig. 6 that only a pair of horizontal lines would be seen on the screen 35. It will be understood that this deflection pattern can be obtained by providing a square wave generator, of the type previously mentioned, for the vertical deflection voltage source 36. This square wave can be applied directly to the vertical deflection electrodes 32 in the tube 20, and also can be integrated to provide the horizontal deflection voltage for the electrodes 30.

In Fig. 7, there is shown a record of film motion obtained by utilizing the deflection voltages of Figs. 1(c) and 1(d) on the horizontal and vertical deflection electrodes 30, 32 in the tube 20. In the record shown in Fig. 7, the "overlaps" occurring in the record of Fig. 5 all are eliminated, and the film motion is clearly shown on an expanded scale.

In Fig. 8 there is illustrated an alternative apparatus which can be used to generate a moving light spot in practicing the method of the present invention. In the apparatus of Fig. 8, a light source 50 is provided, such as an ordinary electric light bulb, for generating light rays which are focused by a lens 52 onto a multiple-surface mirror 54. The mirror 54 is mounted for rotation about an axis parallel to all of the several surfaces thereof, and is mechanically coupled to be rotated by a motor 56. As the mirror 54 is rotated, light rays will be focused by the lens 52 into a light spot on the mirror surface facing the lens at any given instant, and this light spot will be reflected onto a screen 58 and swept thereacross as the mirror rotates. In this case, the light spot motion will always be from left to right across the screen 58, the time rate of displacement of the light spot being as shown in Fig. 1(e), for example. The camera 40 being tested is set up facing the screen 58, as shown in Fig. 8, and the unexposed film is intermittently moved through the camera 40 with the camera shutter held open or removed as previously described.

When the exposed film is developed, a record of film motion will be obtained of the general form shown in Fig. 9.

If desired, time markers of the type shown in Fig. 3 can be provided with the apparatus of Fig. 8 by utilizing a rotating "light copper" or the like to interrupt the light from the source 50 at a uniform rate.

It will be noted that the rate of light spot displacement selected for illustration in Fig. 1(e) has no synchronous relation to the rate of film movement shown in Fig. 1(a). This example of non-synchronous light spot motion and film motion has been selected purposely to show that synchronization between light spot and film motion is not necessary to obtain a record of film motion which can be interpreted without difficulty. Thus, in the record of Fig. 9, the dwell time and pull down time of the film are readily discernible, even though the record of film motion does not have a symmetrical pattern as in the case of the record of Fig. 3.

It will now be apparent that the present invention provides a simple but effective method of obtaining a record of film motion for use in testing and adjusting an intermittent motion type moving picture camera. Since many changes could be made in the specific apparatus shown and described herein for practicing the method of the present invention, all within the scope and spirit of the invention, the foregoing is to be construed as illustrative and not in a limiting sense.

What is claimed is:

1. A method of making a record of intermittent motion of film through a motion picture camera as an aid in testing the operation of the camera, said method comprising the steps of generating a spot of light, moving said spot of light repeatedly through a predetermined path, continuously exposing unexposed film in a motion picture camera being tested to said moving light spot as said film is moving intermittently through said camera, and developing said film after exposure thereof to said moving light spot to bring out on said film the image of said moving light spot as a record of the motion of said film through said camera.

2. A method of making a record of intermittent motion of film through a motion picture camera as an aid in testing the operation of the camera, said method comprising the steps of producing on a screen a spot of light, repeatedly moving said light spot along a predetermined path on said screen, continuously exposing unexposed film in a motion picture camera being tested to said moving light spot on said screen as said film is moving intermittently through said camera, and developing said film after exposure thereof to said moving light spot to bring out on said film the image of said moving light spot as a record of the motion of said film through said camera.

3. A method of making a record of intermittent motion of film through a motion picture camera as an aid in testing the operation of the camera, said method comprising the steps of generating a spot of light, continuously exposing unexposed film in a motion picture camera being tested to said light spot as said film is moving intermittently through said camera, moving said light spot repeatedly through a predetermined path and in synchronism with the motion of said film, and developing said film after exposure thereof to said moving light spot to bring out on said film the image of said moving light spot as a record of the motion of said film through said camera.

4. A method of making a record of intermittent motion of film through a motion picture camera as an aid in testing the operation of the camera, said method comprising the steps of generating a spot of light, continuously exposing unexposed film in a motion picture camera being tested to said light spot as said film is moving intermittently through said camera, moving said light spot repeatedly through a predetermined path and in synchronism with the motion of said film, modulating the intensity of said light spot at a uniform rate, and developing said film after exposure thereof to said moving light spot to bring out on said film the image of said moving light spot as a record of the motion of said film through said camera.

5. Apparatus for making a record of motion picture camera film movement, said apparatus comprising a motion picture camera to be tested, said camera having an intermittent-motion film drive mechanism therein, an unexposed camerafilm disposed in said camera for movement through said camera by said mechanism, said camera being arranged for continuous exposure of said film during movement thereof through said camera, and a light spot generator to produce a spot of light to which said film is exposed during movement thereof through said camera and including means to move said spot of light repeatedly through a predetermined path whereby to obtain on said film an image of said moving light spot as a record of the combined motion of said film and of said light spot.

6. Apparatus as defined in claim 5 including means to synchronize the motion of said spot with the motion of said film.

7. Apparatus as defined in claim 5 wherein said light spot generator comprises a cathode ray tube including means to deflect the cathode ray beam in said tube to provide said repeated motion of said light spot.

8. Apparatus as defined in claim 5 including means for modulating the intensity of said light spot at a uniform rate.

9. Apparatus as defined in claim 5 wherein said light spot generator comprises a screen, a source of light, a multiple-surfaced mirror arranged to reflect light rays originating at said source onto said screen, a lens for focusing the light rays from said source into a spot of light at said mirror, and means to rotate said mirror about an axis parallel to all of the surfaces thereof whereby to provide said repeated motion of said light spot.

References Cited in the file of this patent

UNITED STATES PATENTS

| Number | Name | Date |
|---|---|---|
| 1,151,118 | Mylo | Aug. 24, 1915 |
| 1,199,980 | Gilbreth | Oct. 3, 1916 |
| 1,471,357 | Ruben | Oct. 23, 1923 |
| 1,552,982 | Bradner | Sept. 8, 1925 |
| 1,877,713 | Beck | Sept. 13, 1932 |
| 2,017,653 | Clark et al. | Oct. 15, 1935 |
| 2,067,696 | Crampton | Jan. 12, 1937 |
| 2,253,795 | List | Aug. 26, 1941 |
| 2,510,121 | Lehmann et al. | June 6, 1950 |

OTHER REFERENCES

Article, "A Time Interval and Reference Line Marker for Moving Film Photography of Oscilloscope Traces," by C. W. Kammer, The Review of Scientific Instruments, vol. 19, No. 11, pages 805 through 807, Nov. 1948.